(12) United States Patent
Yamaoka et al.

(10) Patent No.: US 11,812,690 B2
(45) Date of Patent: Nov. 14, 2023

(54) LAWN MOWER AND BLADE ASSEMBLY

(71) Applicant: Nanjing Chervon Industry Co., Ltd., Nanjing (CN)

(72) Inventors: Toshinari Yamaoka, Nanjing (CN); Tianliang Liu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 156 days.

(21) Appl. No.: 17/212,053

(22) Filed: Mar. 25, 2021

(65) Prior Publication Data
US 2021/0321564 A1  Oct. 21, 2021

(30) Foreign Application Priority Data

Apr. 16, 2020 (CN) .......................... 202010298343.6

(51) Int. Cl.
*A01D 34/73* (2006.01)
*A01D 34/00* (2006.01)
(Continued)

(52) U.S. Cl.
CPC ......... *A01D 34/733* (2013.01); *A01D 34/005* (2013.01); *A01D 34/661* (2013.01); *A01D 34/685* (2013.01)

(58) Field of Classification Search
CPC .. A01D 34/733; A01D 34/005; A01D 34/661; A01D 34/685; A01D 34/73
See application file for complete search history.

(56) References Cited

U.S. PATENT DOCUMENTS 3,538,692 A * 11/1970 Cope .................... A01D 34/005
56/295
3,998,037 A * 12/1976 Deans .................... A01D 34/73
D15/17
(Continued)

FOREIGN PATENT DOCUMENTS

EP           0554560 A1    8/1993
WO     2020/063609 A1    4/2020

OTHER PUBLICATIONS

CIPO, office action issued on Canadian patent application No. 3,115,256, dated Sep. 15, 2022, 5 pages.
(Continued)

*Primary Examiner* — Thomas B Will
*Assistant Examiner* — Julia C Tran
(74) *Attorney, Agent, or Firm* — Greenberg Traurig, LLP

(57) ABSTRACT

A lawn mower includes a blade assembly configured to perform a cutting function, a deck formed with an accommodating space for accommodating at least part of the blade assembly and a power mechanism configured to drive the blade assembly to rotate about a rotation axis. The blade assembly includes a cutting blade and a chopping device. The cutting blade is configured to be driven by the power mechanism to rotate about the rotation axis, and the cutting blade includes a cutting edge. The chopping device includes a chopping body, a plurality of chopping teeth, and a plurality of branching ports provided between two adjacent ones of the plurality of chopping teeth. The chopping body is configured to be driven by the power mechanism to rotate and the chopping teeth extend upward or downward from the chopping body.

12 Claims, 12 Drawing Sheets

(51) Int. Cl.
*A01D 34/66* (2006.01)
*A01D 34/685* (2006.01)

(56) References Cited

U.S. PATENT DOCUMENTS

| | | | | |
|---|---|---|---|---|
| 4,269,020 | A * | 5/1981 | Wolf | A01D 34/73 56/13.4 |
| 4,292,791 | A * | 10/1981 | Lalonde | A01D 34/005 56/255 |
| 5,197,268 | A * | 3/1993 | Barrera | A01D 34/005 D15/17 |
| 5,209,052 | A * | 5/1993 | Carroll | A01D 34/73 56/DIG. 17 |
| 5,291,725 | A * | 3/1994 | Meinerding | A01D 34/005 56/255 |
| 5,619,846 | A | 4/1997 | Brown | |
| 5,899,053 | A * | 5/1999 | Roth | A01D 34/73 56/255 |
| 6,145,290 | A * | 11/2000 | Sullivan | A01D 34/005 56/255 |
| 6,487,840 | B1 * | 12/2002 | Turner | A01D 34/73 56/295 |
| 6,688,095 | B2 * | 2/2004 | Wadzinski | A01D 34/6806 56/255 |
| 7,392,853 | B2 * | 7/2008 | Baran | A01D 34/84 172/540 |
| 9,003,754 | B1 * | 4/2015 | Fogle, III | A01D 34/73 56/295 |
| D755,858 | S * | 5/2016 | Brown | D15/17 |
| 2004/0112028 | A1 * | 6/2004 | Duncan | A01D 42/005 56/295 |
| 2006/0042216 | A1 * | 3/2006 | Warashina | A01D 34/826 56/255 |
| 2006/0162310 | A1 | 7/2006 | Dittmer | |
| 2006/0213342 | A1 * | 9/2006 | Turner | A01D 34/73 83/13 |
| 2008/0098706 | A1 | 5/2008 | Siler | |
| 2013/0199148 | A1 * | 8/2013 | Goudeau, Jr. | A01D 34/73 56/295 |

OTHER PUBLICATIONS

EPO, extended European search report issued on European publication No. 3895516A1, dated Aug. 25, 2021, 8 pages.

* cited by examiner

LAWN MOWER AND BLADE ASSEMBLY

RELATED APPLICATION INFORMATION

This application claims the benefit under 35 U.S.C. § 119(a) of Chinese Patent Application No. CN 202010298343.6, filed on Apr. 16, 2020, which application is incorporated by reference in its entirety herein.

BACKGROUND

As one of the most basic operations of lawn trimming, mowing requires the use of simple and efficient mowing machinery to complete mowing tasks with ensured quality and quantity. Lawn mowers have been widely used in the trimming of various types of lawns. As a blade is a functional element of a lawn mower, the structural design of the blade greatly affects the cutting performance of the lawn mower.

Generally, the lawn mower cuts the grass and collects the grass clippings in a collecting bag during operation. Alternatively, the lawn mower may also cut the grass and directly discharge the grass clippings on the ground for mulching during operation. No matter for bagging or for mulching, the grass clippings are expected to be cut into smaller pieces. Therefore, how the lawn mower can cut the grass into smaller pieces and how to improve the cutting efficiency of the lawn mower become urgent technical problems.

SUMMARY

In one example of the disclosure, a lawn mower includes a blade assembly configured to perform a cutting function, a deck formed with an accommodating space for accommodating at least part of the blade assembly, and a power mechanism configured to drive the blade assembly to rotate about a rotation axis. The blade assembly includes a cutting blade and a chopping device. The cutting blade is configured to be driven by the power mechanism to rotate about the rotation axis, the cutting blade includes a cutting edge. The chopping device includes a chopping body, a plurality of chopping teeth, and a plurality of branching ports. The chopping body is configured to be driven by the power mechanism to rotate, the chopping teeth extend upward or downward from the chopping body, and one branching port is provided between two adjacent chopping teeth.

In one example, the chopping teeth of the chopping device extend in a same direction.

In one example, the chopping teeth of the chopping device extend in opposite directions.

In one example, a root of each of the plurality of chopping teeth is arranged on a circumference of a distribution circle, which is a circle centered on the rotation axis; the plurality of chopping teeth extend in a direction parallel to the rotation axis.

In one example, the chopping teeth are arranged on the chopping body at intervals along the radial direction of the distribution circle.

In one example, the chopping teeth are point symmetrically distributed about a center of the chopping device.

In one example, the chopping body is a plate, which includes a mounting portion and an extension wing, the mounting portion is connected with the power mechanism, the extension wing extends radially outward from the mounting portion, and the plurality of chopping teeth are provided on the extension wing.

In one example, the extension wing has a leading edge and a trailing edge, the leading edge is located in front of the trailing edge when the extension wing rotates, and the chopping teeth are provided on at least one of the leading edge or the trailing edge.

In one example, the rotational speed of the chopping device is R revolutions per minute, and the number of the plurality of chopping teeth provided on one of the leading edge and the trailing edge of the extension wing is N, then N is inversely proportional to R and $200 \leq R/N \leq 1800$.

In one example, an auxiliary cutting edge is further provided on at least one of the leading edge or the trailing edge.

In one example, openings of the plurality of branching ports are of a same size.

In one example, the opening of the branching port close to the rotation axis is larger than the opening of the branch port away from the rotation axis.

In one example, the chopping teeth and the chopping body are integrally formed or separately formed; at least one edge of each of the plurality of chopping teeth is provided with a chopping edge.

In one example, the chopping device is provided above the cutting blade; the cutting blade is further formed with a plurality of guiding portions for guiding airflow to move upward.

In one example, the chopping body includes a mounting portion and an extension wing, the mounting portion is provided with a mounting hole, the extension wing includes a leading edge and a trailing edge, and the plurality of chopping teeth are respectively provided on the leading edge and the trailing edge, the plurality of chopping teeth on the leading edge and the plurality of chopping teeth on the trailing edge extend in opposite directions.

In one example, the cutting blade and the chopping device are two separate elements which are connected by means of a connecting element.

In one example of the disclosure, a blade assembly for a lawn mower includes a cutting blade and a chopping device. The cutting blade is configured to be driven by a power mechanism to rotate about a rotation axis, and the cutting blade is provided with a cutting edge. The chopping device includes a chopping body, a plurality of chopping teeth, and a plurality of branching ports, the chopping body is configured to be driven by the power mechanism to rotate, the plurality of chopping teeth extend upward or downward from the chopping body, and one of the plurality of branching ports is provided between two adjacent ones of the plurality of chopping teeth.

In one example, a root of each of the plurality of chopping teeth is arranged on a circumference of a distribution circle, which is a circle centered on the rotation axis; the plurality of chopping teeth extend in a direction parallel to the rotation axis.

In one example, the chopping body is a plate, which includes a mounting portion and an extension wing, the mounting portion is connected with the power mechanism, the extension wing extends radially outward from the mounting portion, and the plurality of chopping teeth are provided on the extension wing.

In one example, the chopping teeth and the chopping body are integrally formed or separately formed, and at least one edge of each of the plurality of chopping teeth is provided with a chopping edge.

In one example, the chopping device is provided above the cutting blade, and the cutting blade is further formed with a plurality of guiding portions for guiding airflow to move upward.

The blade assembly of the present disclosure includes a chopping device provided with chopping teeth, which increases the number of times the blade assembly collides with grass and leaves during rotation, so that the grass clippings are shredded into finer pieces, thereby improving the shredding capacity of the lawn mower and the utilization rate of the collecting bag.

The lawn mower of the present disclosure is provided with a blade assembly having a chopping device, which, on the basis of realizing the cutting function, further improves the shredding ability and the shredding result. The lawn mower chops grass and leaves into smaller pieces when performing lawn mowing and leave collection operations, thereby helping users to sweep and collect fallen leaves. At the same time, due to the improved shredding result, the volume of grass clippings is smaller, thereby reducing the packing density of grass clippings in the collecting bag, so that the collecting bag can collect more grass clippings, which improves the effective volume and utilization rate of the collecting bag. Users are saved from dumping the collecting bag frequently, which improves user experience.

DETAILED DESCRIPTION

Figure 1:
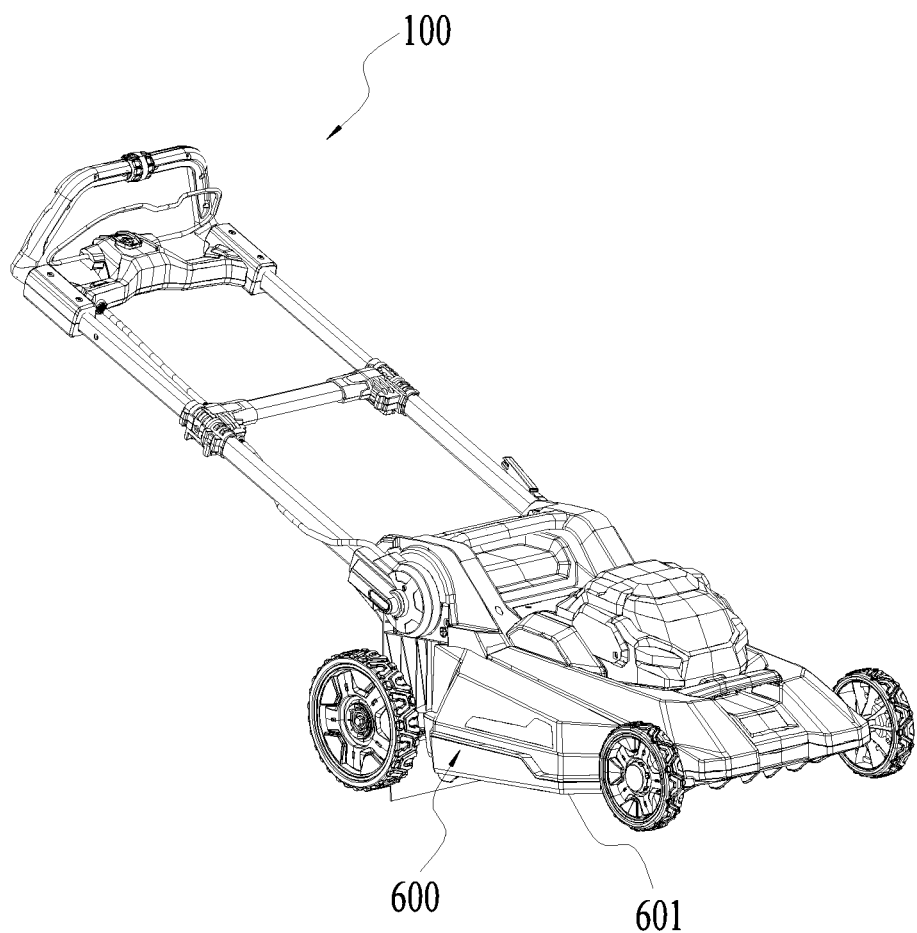
FIG. 1 is a perspective view of a lawn mower according to a first example.

FIG. 1 shows a lawn mower 100 according to a first example of the present disclosure. The lawn mower 100 may be a push lawn mower or a riding lawn mower. In this example, a push lawn mower driven by a motor is taken as an example for description. A "component" in this application refers to a combination of at least one part, and this combination achieves a specific function through interaction or engagement.

Figure 2:
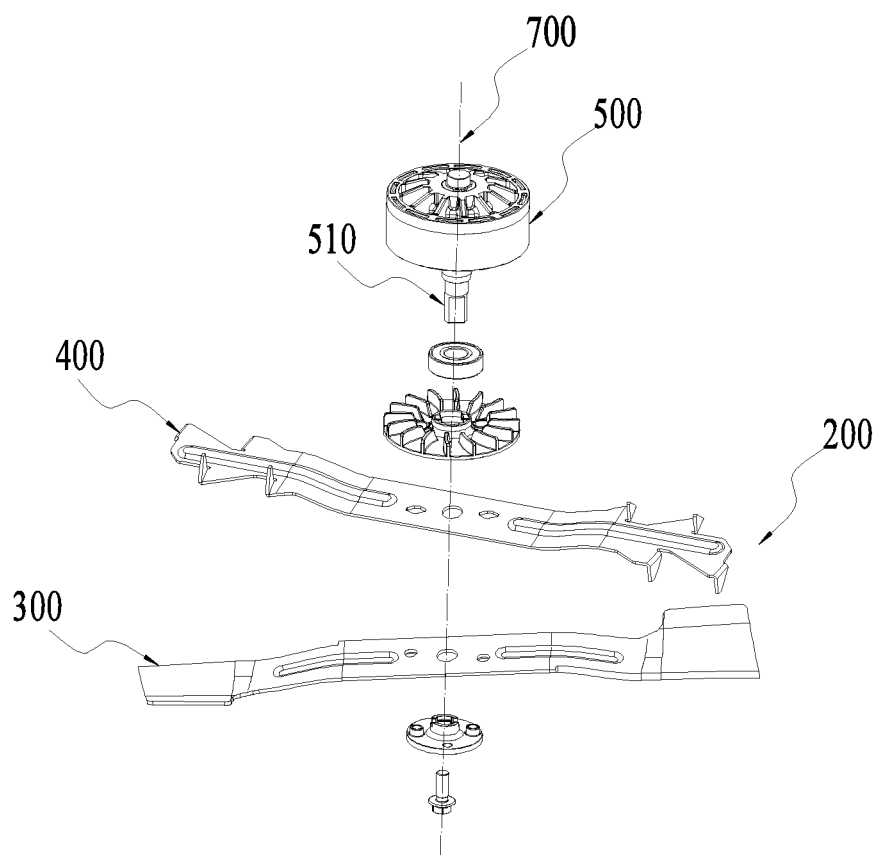
FIG. 2 is an exploded view of a power mechanism and a blade assembly of the lawn mower shown in FIG. 1.
Figure 3:
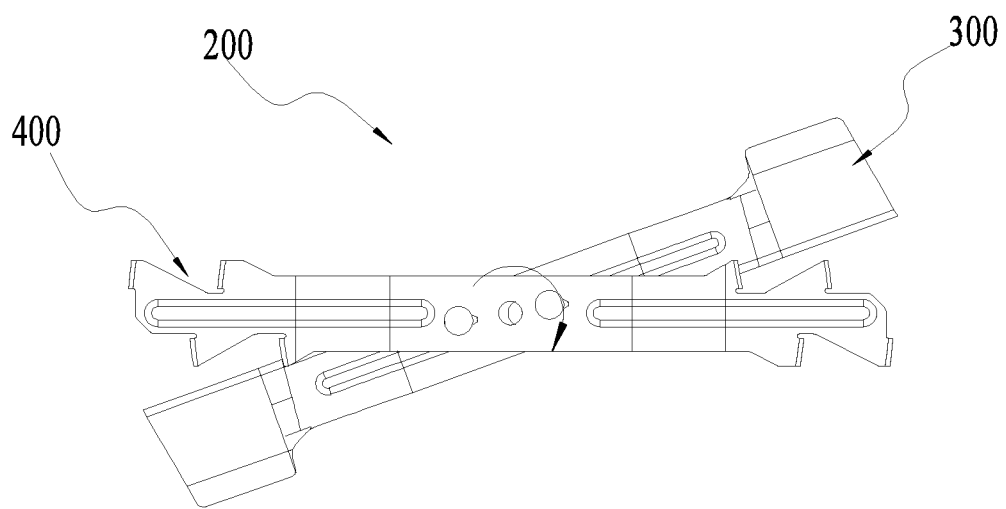
FIG. 3 is a plan view of the blade assembly shown in FIG. 2
Figure 4:
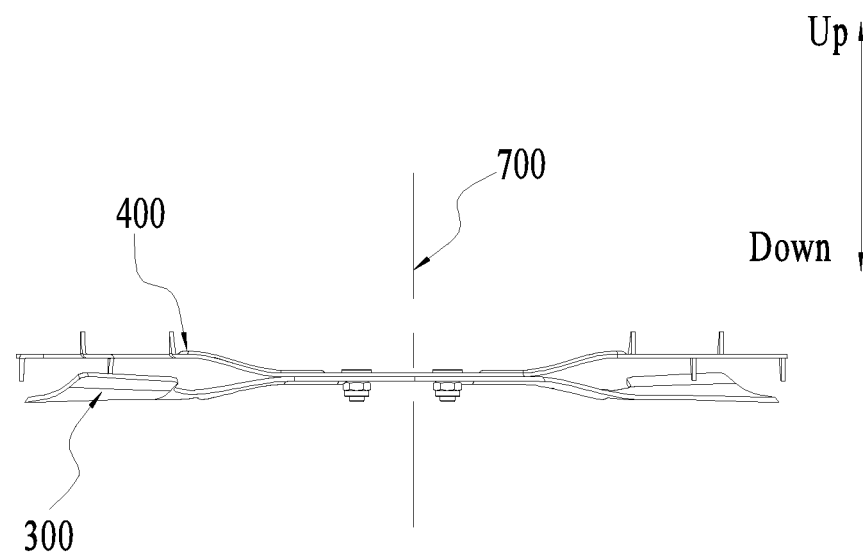
FIG. 4 is a front view of the blade assembly shown in FIG. 3.
Figure 5:
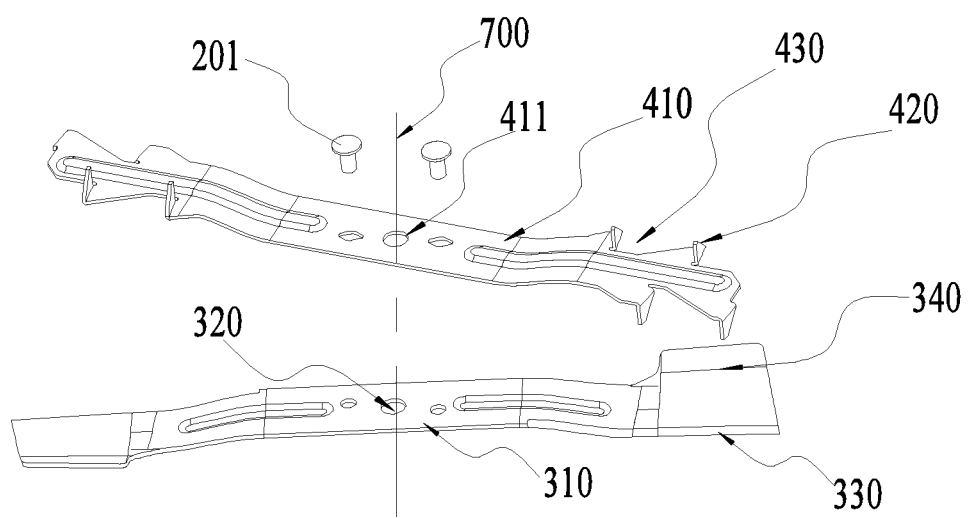
FIG. 5 is an exploded view of the blade assembly shown in FIG. 4.
Figure 6:
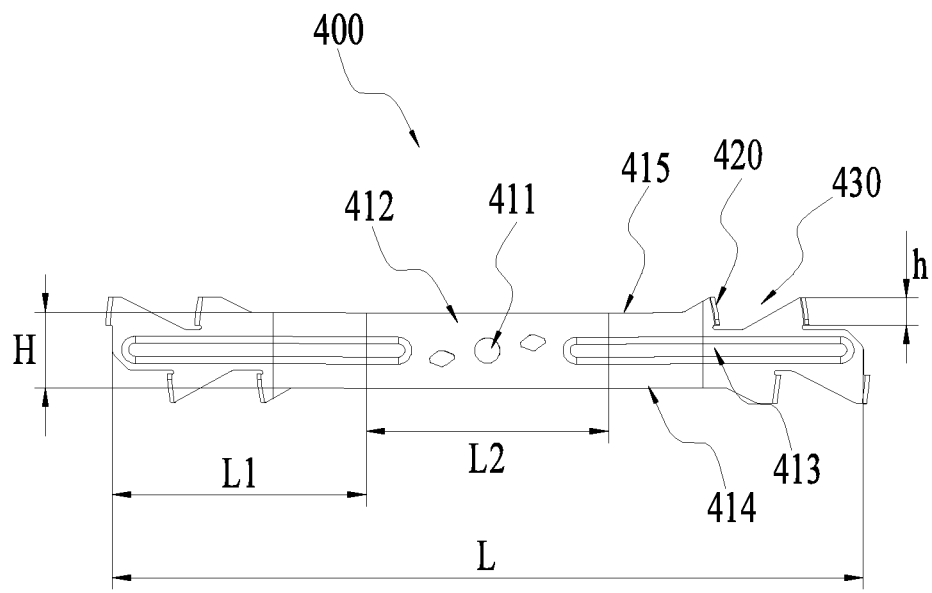
FIG. 6 is a plan view of a chopping device shown in FIG. 5.
Figure 7:
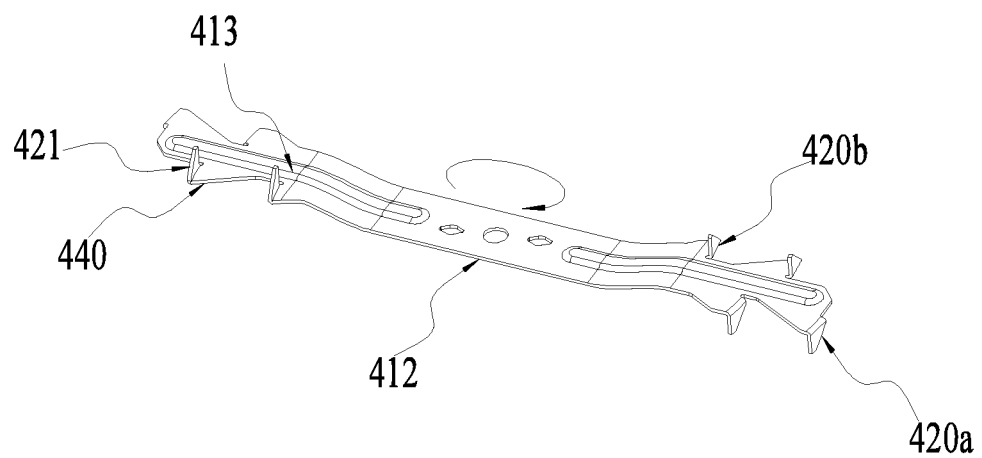
FIG. 7 is a perspective view of the chopping device shown in FIG. 6.
Figure 8:
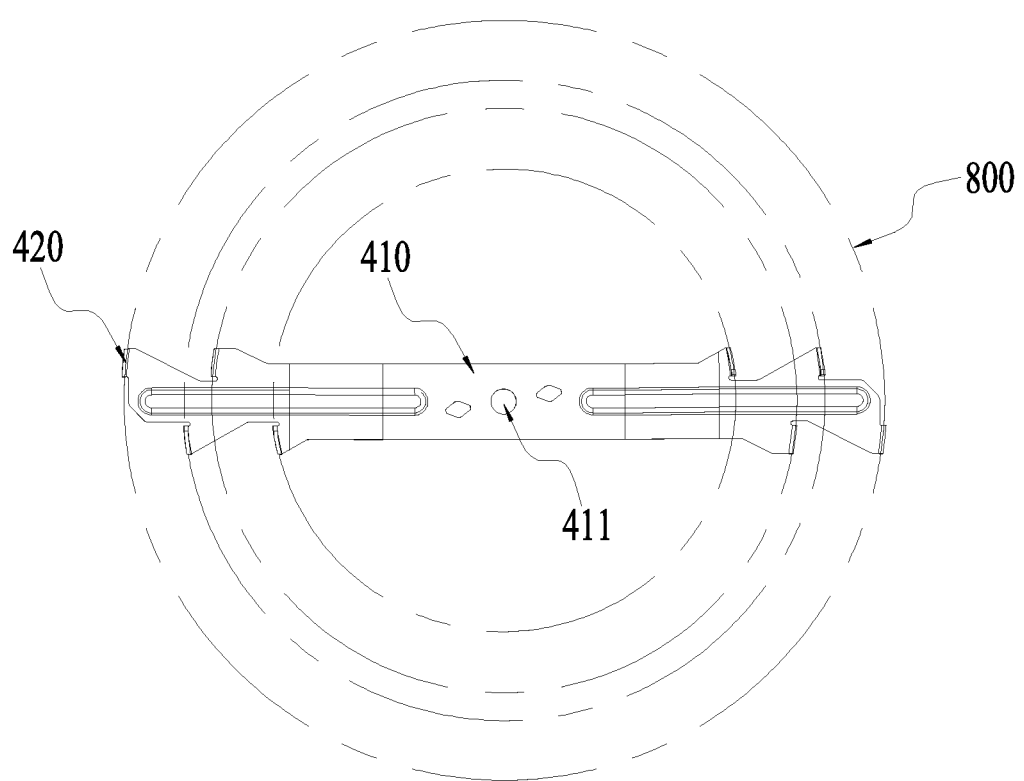
FIG. 8 is a distribution diagram of chopping teeth of the chopping device shown in FIG. 6.

As shown in FIGS. 1 and 2, the lawn mower 100 includes a blade assembly 200, a deck 600, a power mechanism, and a power source. The power mechanism includes a motor 500. The blade assembly 200 is configured to perform the cutting function of the lawn mower 100. An accommodating space 601 for accommodating at least part of the blade assembly 200 is formed in the deck 600. As shown in FIG. 2, the power mechanism drives the blade assembly 200 to rotate about a rotation axis 700 to perform cutting.

The motor 500 is located above the deck 600 and forms a coaxial rotation with the blade assembly 200 about the rotation axis 700. Specifically, the lawn mower 100 further includes an output shaft 510 that drives the blade assembly 200 to rotate, wherein the output shaft 510 may be a motor shaft. Of course, the output shaft 510 may also be connected to the motor shaft through a transmission mechanism, and the transmission mechanism may be a conventional gear mechanism, a pulley mechanism, or the like. The power source in this example is a battery pack, and the battery pack provides power for the motor 500.

The blade assembly 200 includes a cutting blade 300 and a chopping device 400 that cooperate with each other. The cutting blade 300 and the chopping device 400 are two separate elements which are connected by means of a connecting element 201. As shown in FIGS. 2-8, the cutting blade 300 is provided with a cutting edge 330. The cutting blade 300 is configured to be driven by a motor 500 to rotate about the rotation axis 700. The cutting blade 300 performs a cutting function through the rotation of the cutting blade 300. The chopping device 400 is configured to be detachably connected to the cutting blade 300. The chopping device 400 and the cutting blade 300 are coaxially arranged and driven by the motor shaft or the output shaft 510 to rotate together. When the cutting blade 300 performs cutting, the chopping device 400 is configured to assist in shredding the clippings generated in the cutting process, so as to further chop the grass, leaves, etc., which are still relatively large after being cut by the cutting blade 300.

The cutting blade 300 includes a blade body 310, and the blade body 310 is provided with a mounting hole 320 connected with the motor shaft or the output shaft. The cutting edge 330 is provided on one side of the blade body 310. The cutting edge 330 is configured to cut grass and leaves. The cutting edge 330 is formed at a leading edge of the blade body 310. When the blade body 310 rotates, the leading edge is located in front of the trailing edge in the direction of rotation. In this example, the cutting blade 330 refers to a structure with a cutting function for cutting grass and leaves, which may be a common blade. The cutting blade is not limited herein. The cutting edge refers to an integral or continuous structure.

The cutting blade 300 also includes a curved airfoil 340, which is used to generate a vortex and an updraft. The airfoil 340 is formed on the trailing edge of the cutting edge 330. When the blade body 310 rotates, the trailing edge of the blade body 310 is located behind the leading edge in the direction of rotation. The airfoil 340 can form an orderly vortex airflow and updraft airflow during the rotation of the cutting blade 300, so that the grass and leaves in the lawn mower 100 are lifted to be easier to cut.

Two curved airfoils 340 are provided on the same cutting blade 300. Each airfoil 340 is arranged at a distal end of the cutting blade 300 away from the rotation axis. The two airfoils 340 are arranged point symmetrically about a center of the cutting blade 300.

In this example, the cutting blade 300 is made of metal, wherein the cutting blade 300 may be fully or partially coated with a titanium coating to at least enhance the hardness of the cutting edge of the cutting blade 300.

The chopping device 400 is installed axially above the cutting blade 300, but not limited to directly above. The chopping device 400 is driven to rotate synchronously with the cutting blade 300.

In this example, the chopping device 400 and the cutting blade 300 are fixed to each other at an angle by bolts, wherein the included angle between the chopping device 400 and the cutting blade 300 is greater than 0 degree and less than or equal to 90 degrees. Further, in this example, the included angle is 20°. In an alternative example, the chopping device 400 and the cutting blade 300 may not be fixed to each other. The chopping device 400 and the cutting blade 300 are connected to the output shaft 510 respectively, and the output shaft 510 drives them to rotate. Alternatively, the chopping device 400 and the cutting blade 300 may be independently arranged and driven to rotate by two independent power mechanisms.

By setting the cutting blade 300 and the chopping device 400 to work together, on the basis of realizing the cutting function, the shredding ability and shredding result of the lawn mower 100 are further improved, which helps the lawn mower 100 to chop grass and leaves into smaller pieces during lawn mowing and leave collection operations, thereby helping users to sweep and collect fallen leaves. At the same time, due to the improved shredding result, the volume of grass clippings is smaller, thereby reducing the packing density of grass clippings in the collecting bag, so that the collecting bag can collect more grass clippings, which improves the effective volume and utilization rate of the collecting bag. Users are saved from dumping the collecting bag frequently, which improves user experience.

The chopping device 400 includes a chopping body 410, and a plurality of chopping teeth 420 and a plurality of branching ports 430 provided on the chopping body 410. The chopping body 410 is configured to be driven to rotate by the power mechanism. The chopping teeth 420 project from the chopping body 410 and are arranged at an angle to the chopping body 410. The branching ports 430 are formed at a distance between some of the chopping teeth 420. The branching ports 430 form an escape space allowing the clippings to pass through while diverting the clippings, which prevents the clippings from accumulating at the chopping body 410 and causing unnecessary blockage. Each branching port 430 is arranged between two adjacent chopping teeth 420. The chopping teeth 420 project upward or downward from the chopping body 410. It should be noted that, the chopping teeth 420 projecting upward from the chopping body 410 does not restrict the chopping teeth 420 to be projecting vertically upward from the chopping body 410. In fact, the chopping teeth 420 projecting obliquely upward from the chopping body 410 are also regarded as projecting upward for the chopping teeth 420. The chopping teeth 420 projecting downward from the chopping body 410 does not restrict the chopping teeth 420 to be projecting vertically downward from the chopping body 410. In fact, the chopping teeth 420 projecting obliquely downward from the chopping body 410 are also regarded as projecting downward for the chopping teeth 420.

Specifically, the chopping body 410 in this example is a metal plate, which has a central mounting hole 411 configured to receive the motor shaft or the output shaft 510 of the lawn mower. The output shaft 510 passes through the central mounting hole 411 of the chopping body 410 and the mounting hole 320 of the blade body 310 and drives the chopping device 400 to rotate synchronously with the blade body 300.

The metal plate includes a mounting portion 412 and a pair of extension wings 413. The mounting portion 412 is connected to the power mechanism. The central mounting hole 411 is provided on the mounting portion 412 and the extension wings 413 extend radially away from the mounting portion 412.

If the length of the chopping body 410 in its radial direction is L, the length of one extension wing 413 in its radial direction is L1, and the length of the mounting portion 412 in its radial direction is L2, then L1/L is approximately ⅓, and L2/L is approximately ⅓. The chopping teeth 420 are provided on the extension wings 413. The chopping teeth 420 are sequentially distributed along the radial direction of the extension wing 413. If the width of the root of one of the chopping teeth 420 is h and the width of the chopping body 410 is H, then h/H≤½, wherein the width of the chopping body 410 refers to a dimension perpendicular to the radial direction.

As shown in FIGS. 5-8, the chopping teeth 420 of the present disclosure are distributed on circumferences of a plurality of distribution circles 800. The distribution circles 800 are circles centered on the rotation axis 700. The distribution circles 800 may include a plurality of concentric circles, and the chopping teeth 420 extend in a direction parallel to the rotation axis 700. Specifically, the chopping teeth 420 may be arranged on the chopping body 410 at a distance from each other along a radial direction of the distribution circles 800. Alternatively, the chopping teeth 420 may be arranged on the chopping body 410 at a distance from each other along a circumference of the distribution circles 800.

The chopping device 400 includes several chopping teeth 420 connected at an angle to the chopping body 410. Specifically, chopping teeth 420 are provided on at least one of a leading edge 414 and a trailing edge 415 of each extension wing 413, wherein the chopping teeth 420 can either extend in the same direction, or extend in opposite directions. Of course, the chopping teeth 420 on the same chopping body 410 can also be arranged at an angle to each other.

In this example, both the leading edge 414 and the trailing edge 415 of each extension wing 413 are provided with chopping teeth 420. The chopping teeth 420 provided on the leading edge 414 extend in the same direction, and the chopping teeth 420 provided on the trailing edge 415 extend in the same direction. The extension direction of the chopping teeth 420 provided on the trailing edge 415 is opposite to the extension direction of the chopping teeth 420 provided on the leading edge 414.

Specifically, the chopping teeth 420 are distributed on the surface of the chopping body 410 and include first chopping teeth 420a provided on the leading edge 414 and second chopping teeth 420b provided on the trailing edge 415. The first chopping teeth 420a extend below the extension wing 413, and the second chopping teeth 420b extend above the extension wing 413. The extension wings 413 are approximately parallel to the deck, and the chopping teeth 420 are approximately perpendicular to the surface of the extension wing 413. "Above" refers to the side axially towards the deck and "below" refers to the side axially away from the deck. Of course, it can also be arranged that the first chopping teeth extends above the extension wing, and the second chopping teeth extends below the extension wing.

In this example, the extension wings 413 deviate to the axially outer side of the mounting portion 412 to give space to the first chopping teeth 420a extending downward, wherein the axially outer side refers to the side away from the cutting blade 300 in the axial direction of the rotation axis 700.

In another example, chopping teeth with different extension directions may also be provided on the same leading edge, or chopping teeth with different extension directions may also be provided on the same trailing edge. For example, chopping teeth extending upward and downward are provided on the same leading edge at the same time; meanwhile, the chopping teeth in different directions may be arranged at a distance from each other. Or, chopping teeth extending upward and downward are provided on the same trailing edge at the same time; meanwhile, the chopping teeth in different directions may be arranged at a distance from each other.

In another example, extension directions of the chopping teeth on the same chopping device can be the same, for example, all extending upward or all extending downward. Or, extension directions of the chopping teeth on the same extension wing are the same, whereas extension directions of the chopping teeth on different extension wings are opposite.

In this example, the chopping teeth 420 are symmetrically distributed on the extension wings 413 about a center of the chopping device 400. Of course, the chopping teeth 420 may also be arranged at a distance from each other in the radial direction of the extension wings 413.

In this example, each edge of each extension wing 413 is provided with a plurality of chopping teeth 420, which are sequentially distributed along the radial direction of the extension wing 413, that is, the chopping teeth 420 are sequentially arranged on the extension wing 413 along a direction from the distal end of the extension wing 413 away from the center of rotation close towards the center of rotation.

In this example, if the rotational speed of the chopping device 400 is R revolutions per minute, the number of chopping teeth 420 provided on one edge of the extension wing 413 is N, then N is inversely proportional to R, and $200 \leq R/N \leq 1800$. If the spacing between the chopping teeth 420 is D, then $15 \text{ mm} \leq D \leq 100 \text{ mm}$; the spacing between adjacent chopping teeth 420 may be the same or not. Configuring the number and spacing of the chopping teeth 420 within the above range can effectively improve the shredding efficiency. One edge refers to the leading edge 414 or the trailing edge 415 of the extension wing 413.

Specifically, for example, when the rotational speed of the chopping device 400 is 3500 rpm, three chopping teeth may be provided on one edge of the extension wing 413, and the spacing D between the chopping teeth may be 90 mm. Or, when the rotational speed of the chopping device 400 is 2500 rpm, 6 chopping teeth 420 may be provided on the extension wing 413, and the spacing D between the chopping teeth may be 36 mm. Of course, the configuration of the spacing and the number of chopping teeth is not limited to the above settings, as long as it falls within the aforementioned range.

The chopping teeth 420 are distributed on the circumferential surface centered on the rotation axis 700. Specifically, referring to FIG. 8, the roots of the chopping teeth 420 are located on the circumferences of the distribution circles 800 centered on the rotation axis 700, wherein the root refers to the joint between one of the chopping teeth 420 and the chopping body 410. At this time, the chopping teeth 420 may be curved teeth, which are located in cylindrical surfaces formed by the distribution circles 800 moving along the axial direction of the rotation axis 700. Of course, if the size of the roots of the chopping teeth 420 is small, the chopping teeth 420 may also be plane teeth. Similarly, the plane teeth are located in cylindrical surfaces formed by the distribution circles 800 moving along the axial direction of the rotation axis 700.

Through the above arrangement, the air resistance that the chopping teeth 420 needs to overcome during the rotation process is reduced as much as possible, so as to avoid the increase in power consumption of the lawn mower 100 caused by the chopping device 400 to overcome the resistance during the rotation process. On the basis of improving the shredding efficiency of the lawn mower 100, the power consumption of the battery pack is reduced as much as possible, the number of charging is reduced, and the working time of the lawn mower 100 is extended. In other words, the cutting efficiency of the lawn mower 100 is improved without increasing the power consumption of the lawn mower 100 and without affecting the working time of the lawn mower 100.

Since the blade assembly 200 includes the chopping device 400 provided with the chopping teeth 420, the number of times that the blade assembly 200 collides with grass and leaves during the rotation process is increased, so as to chop the cut grass clippings into finer pieces, thereby improving the shredding ability of the lawn mower 100 and the utilization rate of the collecting bag.

The chopping device 400 is used together with the cutting blade 300, and the airfoil 340 arranged on the cutting blade 300 forms an orderly vortex airflow and updraft airflow during the rotation process, so that the grass and leaves in the lawn mower 100 are raised and suspended above the cutting blade 300 to fully contact and collide with the chopping device 400 located above the cutting blade 300, thereby being fully shredded, further improving the cutting efficiency of the blade assembly 200.

The chopping device 400 further includes a plurality of connecting portions 440, wherein each of the chopping teeth 420 is connected to the chopping body 410 through the connecting portion 440. Specifically, in this example, a part of the chopping body 410 constitutes the connecting portions 440, wherein the branching port 430 is formed between adjacent connecting portions 440. The sizes of the openings of the branching ports 430 may be the same. Of course, the sizes of the openings of the branching ports 430 may also be different; if this is the case, the opening of the branching port 430 close to the rotation axis 700 is larger than the opening far away from the rotation axis 700.

In this example, the chopping body 410 and the chopping teeth 420 are integrally formed. In other examples, the chopping teeth may also be formed separately from the chopping body and then assembled and fixed on the chopping body by, for example, welding or screws.

In this example, the chopping teeth 420 are triangular teeth; nevertheless, they may also be one of or a combination of rectangular teeth, diamond teeth, trapezoidal teeth, and irregular-shaped teeth. At the same time, in order to improve the shredding efficiency, a chopping edge 421 is provided on at least one edge of each of the chopping teeth 420. Of course, in order to further improve shredding efficiency, a chopping edge 421 may also be provided at the edge of the connecting portion 440 and the edge of the branching port 430.

Figure 9:
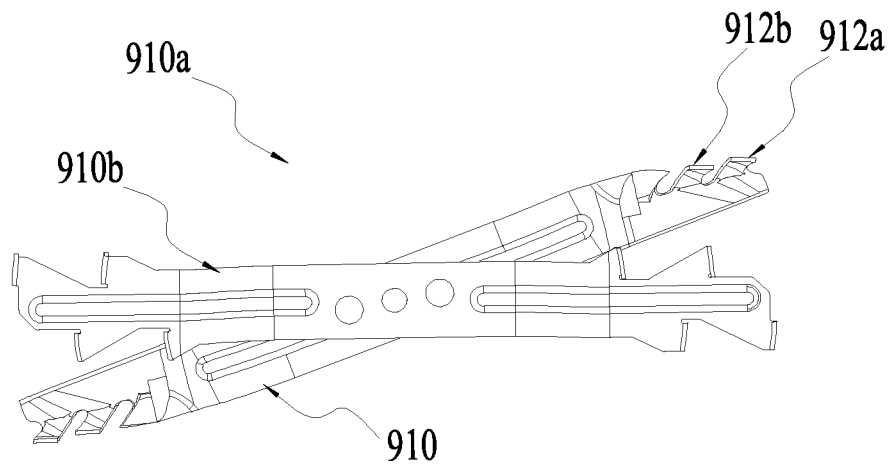
FIG. 9 is a plan view of a blade assembly according to a second example.
Figure 10:
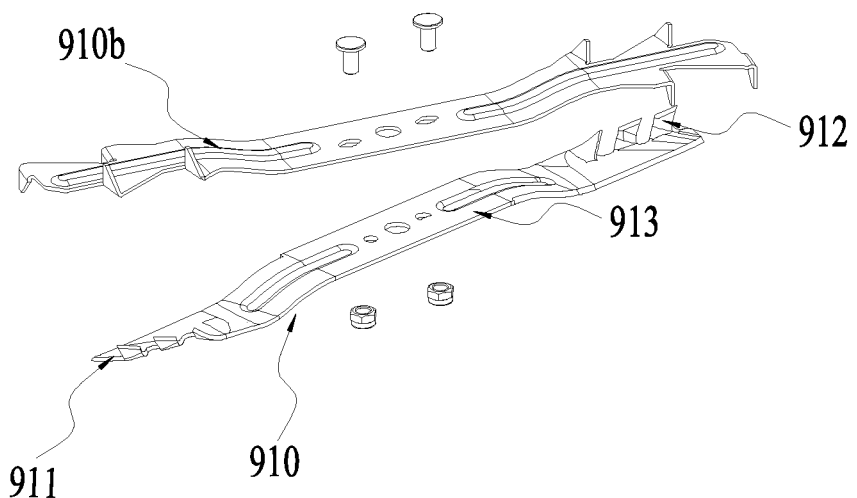
FIG. 10 is an exploded view of the blade assembly shown in FIG. 9.
Figure 11:
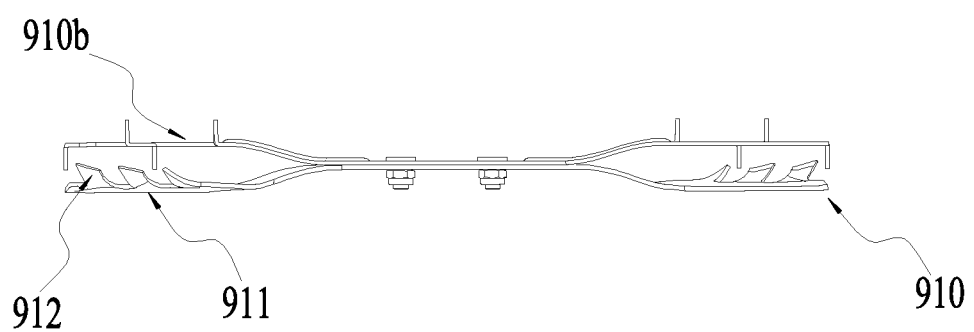
FIG. 11 is a front view of the blade assembly shown in FIG. 9.
Figure 12:
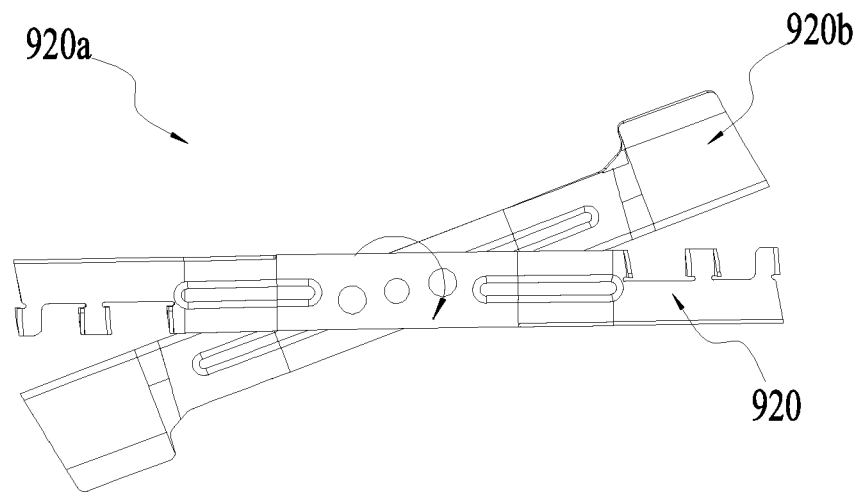
FIG. 12 is a plan view of a blade assembly according to a third example.

Referring to FIGS. 9-11, a blade assembly 910a according to a second example includes a chopping device 910b of the same structure as the chopping device 400 of the first example. The blade assembly 910a also includes a cutting blade 910 of a different structure from the cutting blade 300 of the first example.

An airfoil 911 of the cutting blade 910 may further include a plurality of guiding portions 912, all of which extend along the airfoil 911, and the plurality of guiding portions 912 are arranged at a distance from each other. Specifically, the plurality of guiding portions 912 are separate entities, and the plurality of guiding portions 912 are configured to guide the airflow to move upward. One airfoil 911 includes two guiding portions, namely a first guiding portion 912a and a second guiding portion 912b. The first guiding portion 912a and the second guiding portion 912b are integrally formed with the blade body 913. The first guiding portion 912a and the second guiding portion 912b are arranged on the cutting blade 910 in sequence substantially along the length direction of the cutting blade 910. The first guide portion 912a and the second guide portion 912b extend upward at an angle to the surface of the cutting blade 910, wherein "upward" refers to a direction relatively away from the ground along the rotation axis. In other examples, the first guiding portion and the second guiding portion can also be formed separately from the blade body, and then fixedly connected to the cutting blade. In some examples, the cutting blade may also be provided with more guiding portions such as a third guiding portion and a fourth guiding portion, and the plurality of guiding portions are arranged in sequence along the extending direction of the cutting blade, wherein the extending direction of the cutting blade refers to the direction radially outward from the center of rotation of the cutting blade.

The first guiding portion 912a is curved upward along a first curved surface, and the second guiding portion 912b is curved upward along a second curved surface. The first curved surface and the second curved surface at least partially have different curvatures. The first guiding portion 912 and the second guiding portion 912b may each have a fixed curvature. Alternatively, the curvatures of the first guiding portion 912 and the second guiding portion 912b may vary regularly, according to a predefined rule, or irregularly, which is not limited herein.

Further, at least one guiding portion 912 is provided with a cutting edge. Specifically, a cutting edge is formed on the outer side of the first guiding portion 912 and the second guiding portion 912b. The cutting edge can further cut the clippings and improve the shredding capacity of the lawn mower. The cutting edge may be a conventional straight-line cutting edge or of an unconventional structure, which is not limited herein as long as it has the ability to cut.

As shown in FIGS. 12 to 16, according to a third example, a blade assembly 920a includes a cutting blade 920b having the same structure as the cutting blade 300 in the first example. In this example, the blade assembly 920a further includes a chopping device 920 that is different from the chopping device 400 in the first example.

In this example, the chopping device 920 includes a chopping body 921, a plurality of chopping teeth 922, and a plurality of branching ports 923, wherein the chopping body 921 is arranged to rotate coaxially with the cutting blade 920b, and the chopping teeth 922 extend from the chopping body 921 and are arranged at an angle to the chopping body 921. The branching ports 923 are formed at a distance between some of the chopping teeth 922. The branching ports 923 form an escape space allowing the clippings to pass through while diverting the clippings, which prevents the clippings from accumulating at the chopping body 921 and causing unnecessary blockage.

In this example, the chopping device 920 and the cutting blade 920b are also fixed at an angle with each other by bolts, wherein the fixing method and the angle configuration method are the same as in the previous example and will not be repeated herein.

The chopping body 921 is a metal plate. The metal plate includes a mounting portion 921a and a pair of extension wings 921b. The mounting portion 921a is provided with a central mounting hole 921c connected to the output shaft of the power mechanism. The extension wings 921b extend outward along the radial direction of the mounting portion 921a, and the chopping teeth 922 are provided on the extension wings 921b.

The chopping teeth 922 are provided on the trailing edge 921d of the extension wing 921b, the chopping teeth 922 are distributed on the surface of the chopping body 921, wherein the extension wing 921b is approximately parallel to the deck, and the chopping teeth 922 are approximately perpendicular to the extension wing 921b. The chopping teeth 922 include first chopping teeth 922a and second chopping teeth 922b which are arranged at a distance from each other on the extension wing 921b. The first chopping teeth 922a extend below the extension wing 921b, whereas the second chopping teeth 922b extend above the extension wing 921b.

Figure 13:
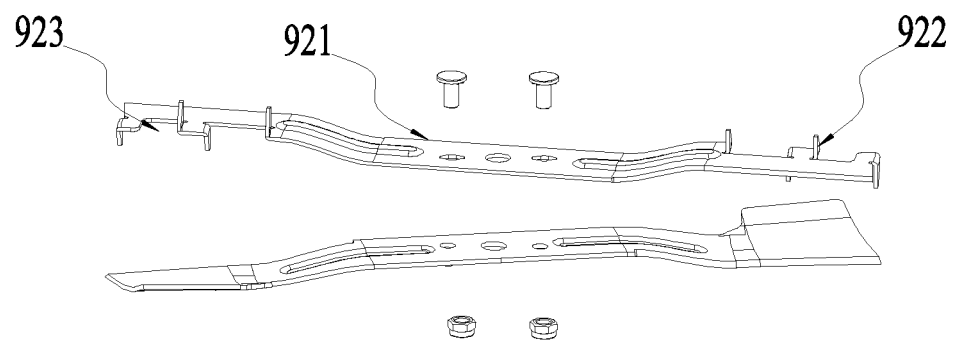
FIG. 13 is a perspective view of the blade assembly shown in FIG. 12.
Figure 14:
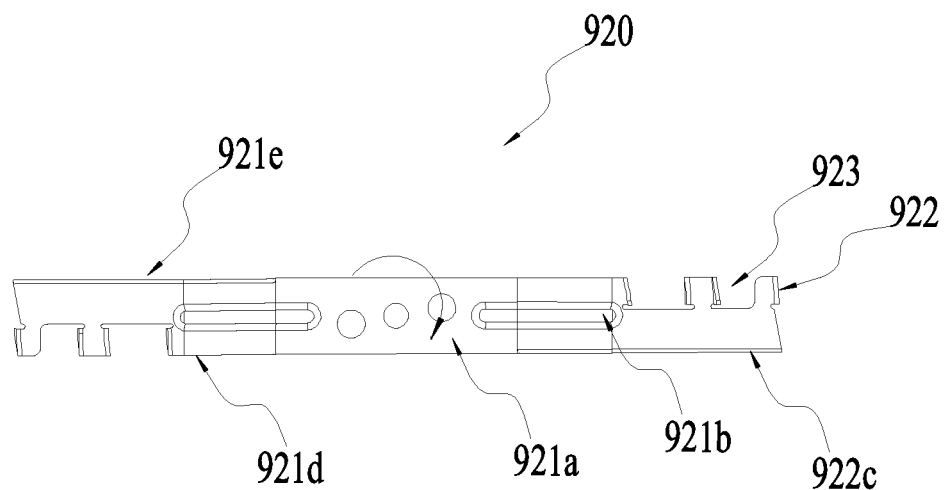
FIG. 14 is a plan view of a chopping device shown in FIG. 12.
Figure 15:
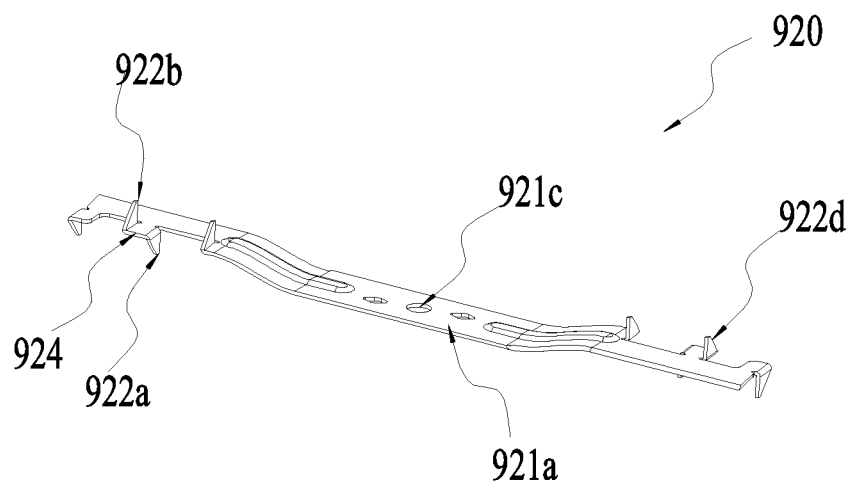
FIG. 15 is a perspective view of the chopping device shown in FIG. 14.
Figure 16:
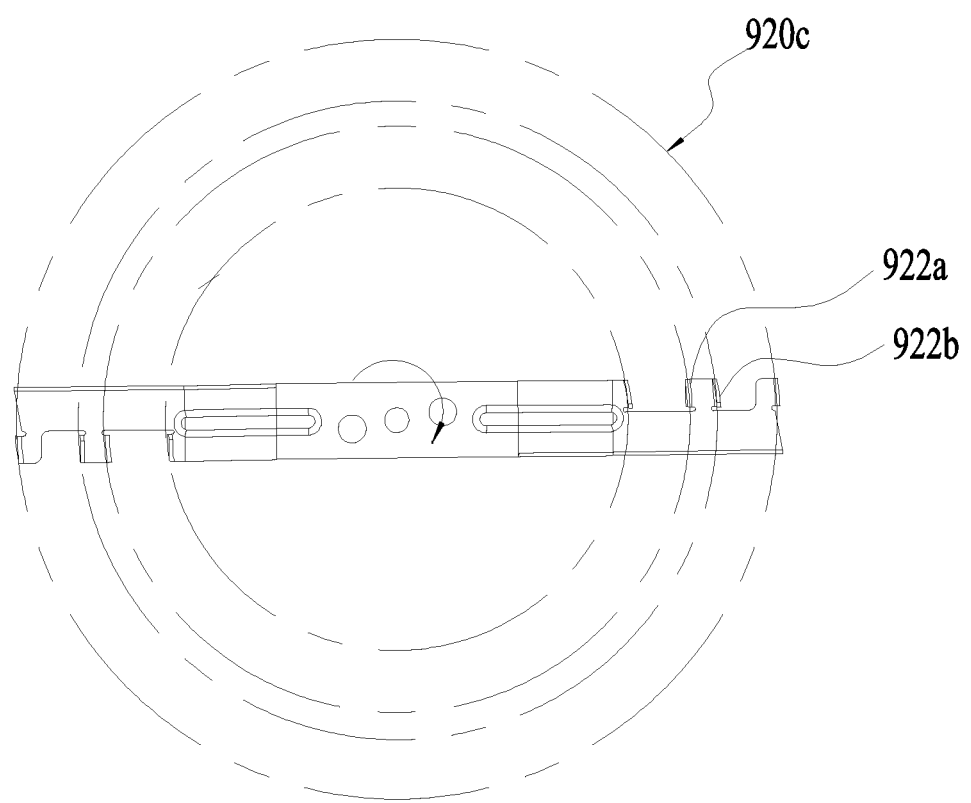
FIG. 16 is a distribution diagram of chopping teeth of the chopping device shown in FIG. 14.

Wherein, since the leading edge 921e is not provided with chopping teeth 922, in this example, the leading edge 921e of the chopping device 920 is provided with an auxiliary cutting edge 922c as shown in FIGS. 13 and 15 to improve shredding efficiency. Of course, chopping teeth 922 may also be provided on the leading edge 921e.

In this example, the extension wings 921b deviate to the axially outer side of the mounting portion 921a to give space to the installation and rotation of the first chopping teeth 922a, wherein the axially outer side refers to the side away from the cutting blade 920b in the axial direction of the rotation axis.

In another example, the chopping teeth on the same extension wing may extend in the same direction, and the chopping teeth on different extension wings extend in opposite directions; or, the chopping teeth on the same chopping device all extend in the same direction, for example, all upwards or all downwards.

In the present disclosure, the chopping teeth 922 are distributed on cylindrical surfaces centered on the rotation axis. Specifically, the roots of the chopping teeth 922 are located on the circumferences of the distribution circles 920c centered on the rotation axis, wherein the root refers to the joint between one of the chopping teeth 922 and the chopping body 921. At this time, the chopping teeth 922 may be curved teeth. The curved teeth are located in cylindrical surfaces formed by the distribution circles 920c moving along the axial direction of the rotation axis. Of course, if the size of the roots of the chopping teeth 922 is small, the chopping teeth 922 may also be plane teeth. Similarly, the plane teeth are located in cylindrical surfaces formed by the distribution circles 920c moving along the axial direction of the rotation axis.

Through the above arrangement, the air resistance that the chopping teeth 922 needs to overcome during the rotation process is reduced as much as possible, so as to avoid the increase in power consumption of the lawn mower caused by the chopping device 920 to overcome the resistance during the rotation process. On the basis of improving the shredding efficiency of the lawn mower, the power consumption of the battery pack is reduced as much as possible, the number of charging is reduced, and the working time of the lawn mower is extended. In other words, the cutting efficiency of the lawn mower is improved without increasing the power consumption of the lawn mower and without affecting the working time of the lawn mower.

In this example, the chopping device 920 further includes a plurality of connecting portions 924, wherein each chopping teeth 922 is connected to the chopping body 921 through the connecting portion 924. Specifically, in this example, a part of the chopping body 921 constitutes the connecting portion 924, wherein the branching port 923 is formed between adjacent connecting portions 924. The sizes of the openings of the branching ports 923 may be different, wherein the opening of the branching port 923 close to the rotation axis is larger than the opening far from the rotation axis. Of course, the sizes of the openings of the branching ports 923 may also be the same.

In this example, the chopping body 921 and the chopping teeth 922 are integrally formed. Of course, the chopping teeth 922 may also be formed separately from the chopping body 921 and then assembled and fixed to the chopping body 921 by welding or screws.

Similarly, in this example, if the rotational speed of the chopping device 920 is R revolutions per minute, the number of chopping teeth 922 provided on one edge of the extension wing 921b is N, then N is inversely proportional to R, and $200 \leq R/N \leq 1800$. If the spacing between the chopping teeth 922 is L, then $15 \text{ mm} \leq L \leq 100 \text{ mm}$; the spacing between adjacent chopping teeth 922 may be the same or not. Configuring the number and spacing of the chopping teeth 922 within the above range can effectively improve the shredding efficiency. One edge refers to the leading edge 921e or the trailing edge 921d of the extension wing 921b.

Specifically, for example, when the rotational speed of the chopping device 920 is 3,500 rpm, three chopping teeth may be provided on one edge of the extension wing 921b, and the spacing L between the chopping teeth may be 90 mm. Or, when the rotational speed of the chopping device 920 is 2500 rpm, 6 chopping teeth 922 may be provided on the extension wing 921b, and the spacing L between the chopping teeth may be 36 mm. Of course, the configuration of the spacing and the number of chopping teeth is not limited to the above settings, as long as it falls within the aforementioned range.

In this example, the chopping teeth 922 are triangular teeth; nevertheless, they may also be one of or a combination of rectangular teeth, diamond teeth, trapezoidal teeth, and irregular-shaped teeth. At the same time, in order to improve the shredding efficiency, a chopping edge 922d as shown in FIG. 15 is provided on at least one edge of each of the chopping teeth 922. Of course, in order to further improve shredding efficiency, a chopping edge 922d may also be provided at the edge of the connecting portion 924 and the edge of the branching port 923.

Figure 17:
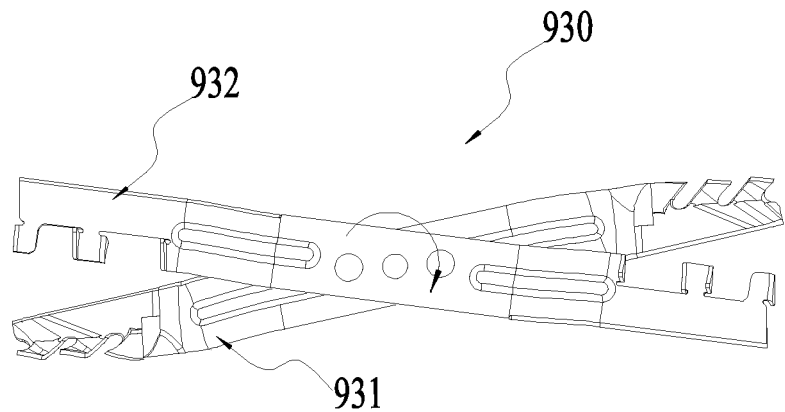
FIG. 17 is a plan view of a blade assembly according to a fourth example.
Figure 18:
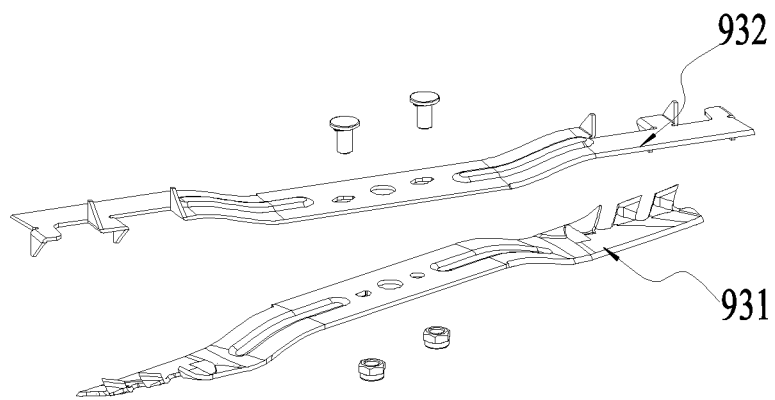
FIG. 18 is an exploded view of the blade assembly shown in FIG. 17.

Referring to FIGS. 17 and 18, a blade assembly 930 according to a fourth example includes a cutting blade 931 having the same structure as the cutting blade 910 in the second example and a chopping device 932 having the same structure as the chopping device 920 in the third example.

The above shows and describes the basic principles, main features and advantages of the present disclosure. Those skilled in the art should understand that the above-mentioned examples do not limit the present disclosure in any form, and all technical solutions obtained by equivalent substitutions or equivalent transformations fall within the protection scope of the present disclosure.

What is claimed is:

1. A lawn mower comprising:
a blade assembly configured to perform a cutting function;
a deck formed with an accommodating space for accommodating at least part of the blade assembly; and
a power mechanism configured to drive the blade assembly to rotate about a rotation axis;
wherein the blade assembly comprises:
a cutting blade configured to be driven by the power mechanism to rotate about the rotation axis having a cutting edge; and
a chopping device comprising a chopping body, a plurality of chopping teeth, and a plurality of branching ports;
wherein the chopping body is configured to be driven by the power mechanism to rotate, and the chopping body is a plate which comprises a mounting portion and an extension wing, wherein the mounting portion is connected with the power mechanism and the extension wing extends radially outward from the mounting portion,
the plurality of chopping teeth extend upward or downward from the chopping body, and one of the plurality of branching ports is provided between two adjacent ones of the plurality of chopping teeth,
the plurality of chopping teeth are provided on the extension wing, and
the extension wing has a leading edge and a trailing edge, the leading edge is located in front of the trailing edge when the extension wing rotates, and the plurality of chopping teeth are provided on one of the leading edge or the trailing edge, and
wherein at least a root of each of the plurality of chopping teeth is arranged on a circumference of one of a plurality of distribution circles centered on the rotation axis and the plurality of chopping teeth extend in a direction parallel to the rotation axis.

2. The lawn mower of claim 1, wherein the plurality of chopping teeth of the chopping device extend in a same direction.

3. The lawn mower of claim 1, wherein a first number of the plurality of chopping teeth of the chopping device extend in a first direction and a remaining number of the plurality of chopping teeth of the chopping device extend in a second direction opposite to the first direction.

4. The lawn mower of claim 1, wherein the plurality of chopping teeth are arranged on the chopping body at a distance from each other along a radial direction of one of the plurality of distribution circles.

5. The lawn mower of claim 1, wherein the plurality of chopping teeth are point symmetrically distributed about a center of the chopping device.

6. The lawn mower of claim 1, wherein a rotational speed of the chopping device is R revolutions per minute, a number of the plurality of chopping teeth provided on one of the leading edge and the trailing edge of the extension wing is N, N is inversely proportional to R, and $200 \leq R/N \leq 1800$.

7. The lawn mower of claim 1, wherein an auxiliary cutting edge is further provided on at least one of the leading edge or the trailing edge.

8. The lawn mower of claim 1, wherein an opening of each one of the plurality of branching ports is of a same size.

9. The lawn mower of claim 1, wherein an opening of one of the plurality of branching ports close to the rotation axis is larger than an opening of one of the plurality of branching ports away from the rotation axis.

10. The lawn mower of claim 1, wherein the plurality of chopping teeth and the chopping body are integrally formed or separately formed and at least one edge of each of the plurality of chopping teeth is provided with a chopping edge.

11. The lawn mower of claim 1, wherein the chopping device is provided above the cutting blade and the cutting blade is further formed with a plurality of guiding portions for guiding an airflow generated by operation of the lawn mower upward.

12. The lawn mower of claim 1, wherein the cutting blade and the chopping device are two separate elements which are connected by means of a connecting element.

* * * * *